Sept. 25, 1951     J. B. PARSONS     2,568,930
SEAT ADJUSTER

Filed Dec. 22, 1945     2 Sheets-Sheet 1

INVENTOR.
John B. Parsons
BY Malcolm W. Fraser
attorney

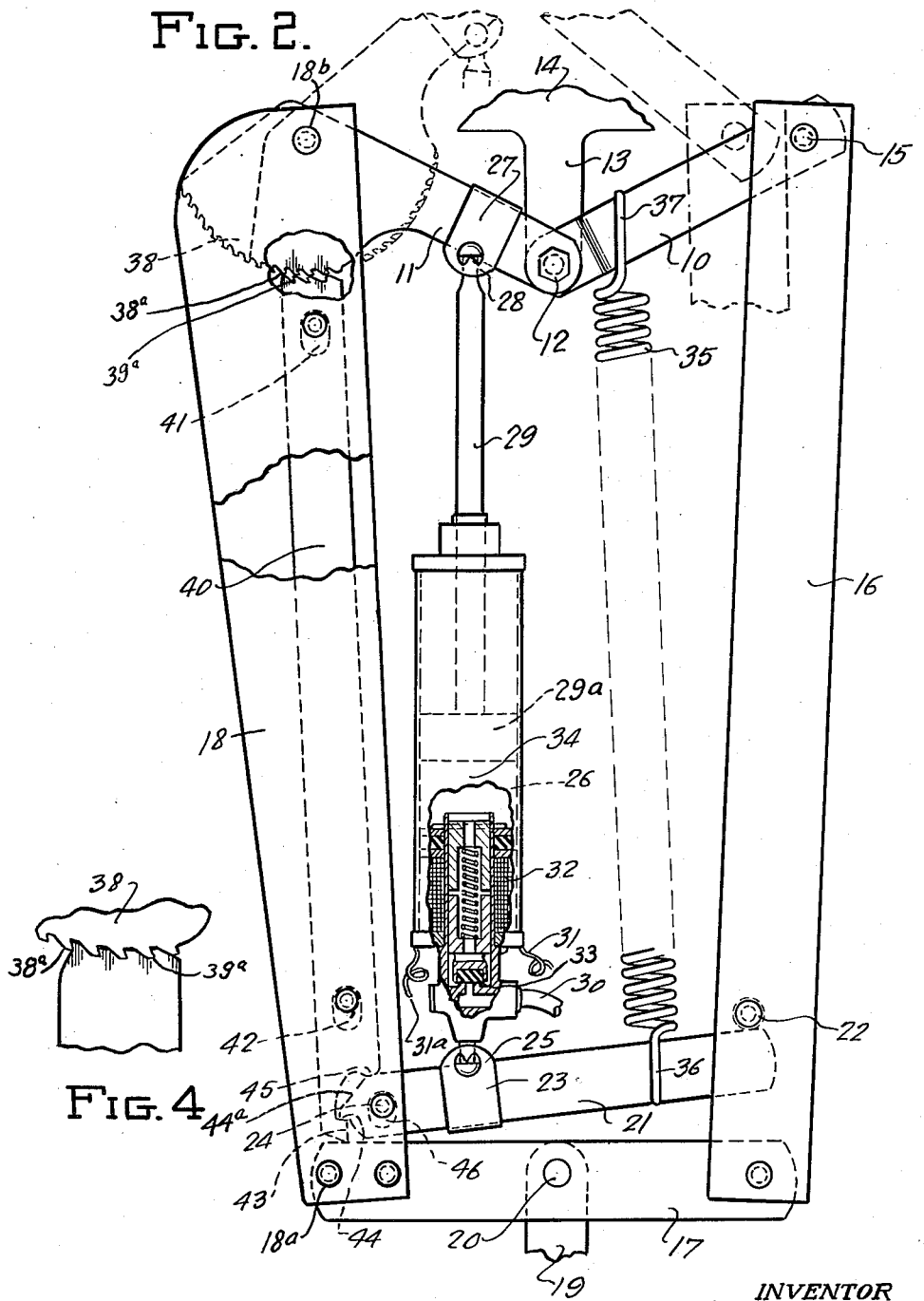

Patented Sept. 25, 1951

2,568,930

UNITED STATES PATENT OFFICE 2,568,930

SEAT ADJUSTER

John B. Parsons, Toledo, Ohio

Application December 22, 1945, Serial No. 636,717

4 Claims. (Cl. 155—14)

This invention relates to a vehicle seat adjusting mechanism particularly adapted for moving a seat frame to one of a number of forward or rearward positions.

An object is to produce a new and improved vehicle seat adjusting mechanism having novel features of construction militating against uncontrolled forwardly shifting movements of the adjustable seat not infrequently occurring during sudden vehicle stops or deceleration.

Another object of this invention is to produce an automatic regulator assembly of the type described, comprising simply formed interconnecting elements adapted to be assembled prior to vehicle installation, thus expediting the mass production of the vehicle.

Other objects and advantages of this invention will hereinafter appear, and for purposes of illustration but not of limitation, an embodiment of the invention is shown in the accompanying drawings in which Figure 1 is a schematic drawing showing the seat adjuster mounted adjacent the front seat of a motor vehicle;

Figure 2 is an enlarged plan view of the seat adjusting mechanism, parts being cut away more clearly to illustrate the elements, the same being shown in the rearwardly adjusted position, the broken lines indicating the position of the elements in the forward position;

Figure 4 is an enlarged fragmentary view showing the teeth of the pawl bar enmeshed with the teeth of the ratchet sector.

Figure 1:
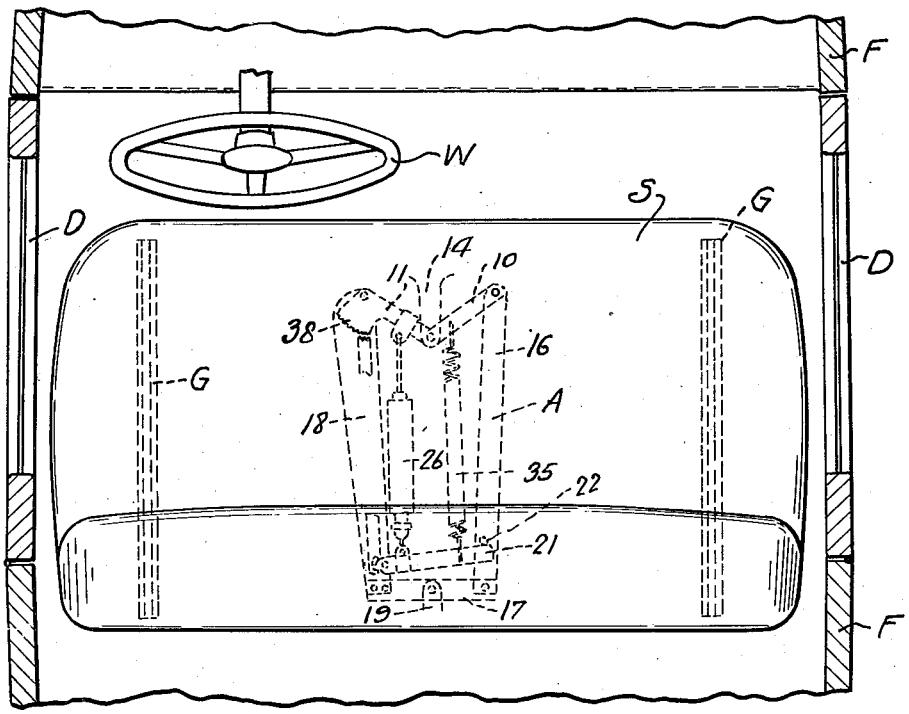

The illustrated embodiment of the invention comprises a seat adjusting mechanism A positioned on the under side of the vehicle seat S which is shown disposed between the vehicle panels F and the side doors D and to the rear of the steering wheel W. The front vehicle seat S is adjustable either forwardly or rearwardly on the guide members G in response to actuation of the mechanism A to be hereinafter described.

The adjusting mechanism, as illustrated in Figure 2, comprises two divergent lever or regulator arms 10 and 11, the adjacent ends of which are pivotally connected at 12 where, also, is joined an arm 13 of a bracket member 14 connecting the mechanism A in any suitable manner to the under side of the adjustable seat S. The opposite end of the lever arm 10 is connected for swinging movement by a rivet 15 to one end of a frame arm 16. The opposite end of the frame arm 16 is pivotally connected for swinging movement to one end of a cross bar 17, which is positively positioned at the other end between the adjacent ends of a pair of spaced and superposed stationary sheet metal frame members 18, by means of shouldered rivets 18a, which, together with other like rivets, maintain the spaced relation between the frame members to comprise a rigid frame part. As illustrated in Figure 2, the aligned sheet metal members 18 are formed to be progressively wider in the outer or forward direction more ably to absorb the stresses encountered during operation. The inner end of the lever arm 11 is pivotally mounted between the outer ends of the frame members 18 by means of a shouldered rivet 18b. The inner end of the assembly is anchored to the vehicle floor by means of a bracket 19 which is pivotally secured at 20 to an intermediate portion of the cross bar 17. The outward swinging movement of a lever or bracket arm 21, pivotally mounted between the inner ends of the frame members 18, is restricted by a rivet 22 secured to the inner end portion of the frame arm 16.

A fastener 23 mounted on the arm 21 adjacent one end provides a ball joint with the inner end portion of a linear motor 26 permitting rocking movements thereof. Another fastener 27 mounted on an intermediate portion of the lever arm 11 provides another ball joint 28 between the arm 11 and the upper end of a piston rod 29 forming a part of the linear motor 26. Detailed description of the linear motor is considered unnecessary; suffice it to say that a tube 30 connects the linear motor with a pump or other source of liquid under pressure (not shown). Electrical wires 31 and 31a conduct electrical current to a solenoid 32 arranged within a cylinder 34 and which, upon being energized, effects the opening of a valve, generally indicated at 33, permitting the flow of liquid into the cylinder to impart outward movement to a piston 29a and the piston rod 29. A helical coil spring 35 is disposed alongside the linear motor, one end 36 of the coil spring being hooked on the lever arm 21 and the other end 37 being attached to the lever arm 10. When the valve 33 is open and the pump is idle, the spring 35 moves the arms 10 and 11 inwardly. Reference is hereby made to my "co-pending" Patent 2,393,406, dated January 22, 1946, and my co-pending Patent No. 2,479,398, dated August 16, 1949 wherein the piston cylinder assembly and pump mechanism are shown and described in detail.

Manifestly, energization of the solenoid 32 effects the opening of the valve 33 permitting liquid under pressure to enter the cylinder, causing the piston and piston rod 29 to move outwardly, imparting forward rocking movement to the lever arms 10 and 11 and thereby through the arm 13 and bracket 14 move the seat S forwardly, as illustrated by the broken lines in Figure 2. Such movement operates to tension the coil spring 35 in readiness to move the seat in the opposite direction as above explained.

In the event the vehicle is abruptly stopped or decelerated, as by sudden application of brakes or collision, the seat S would ordinarily surge or move forwardly in an uncontrolled manner. It is desired to obviate such objectionable movement and, for that purpose, the inner end of the lever arm 11 is formed into an integral sector 38, the curved peripheral edge of which has inclined ratchet-like teeth 38a. Slidable longitudinally between the frame members 18 is a bar 40, which is formed with longitudinally elongate slots 41 through which extend shouldered rivets 42. Thus, the slots 41 guide the longitudinal sliding movements of the bar 40. The outer end of the bar 40 is formed with inclined teeth 39a, which are adapted to be brought into mesh with certain of the teeth 38a of the sector 38 and in so doing, positively lock the sector and its arm 11 against advancing movement, thereby militating against the objectionable surging movement above mentioned.

Figure 3:
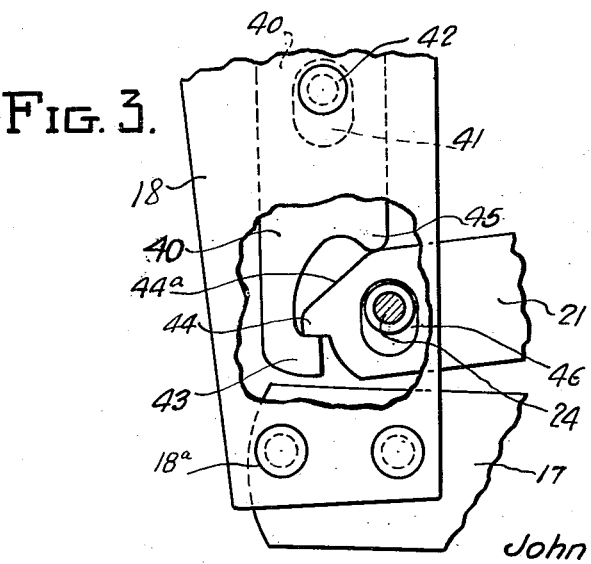
Figure 3 is an enlarged fragmentary view of the interconnecting elements effecting the movement of the pawl bar.

The inner end of the pawl bar 40 is formed with a substantially L-shaped finger extension 43 and projecting into such extension is an integral abutment 44 on the adjacent end of the lever or bracket arm 21. The abutment 44 has a flat inner surface to engage a portion of the extension 43. The other edge of the abutment 44 is inclined as indicated at 44a and the inside edge of the finger 43 is so shaped that the bracket arm 21 can rock in a clockwise direction (Figure 3) without interfering with or imparting movement to the pawl bar. It is obvious, however, that rocking movement of the arm 21 in the opposite or counterclockwise direction will cause the abutment 44 to engage the finger extension and impart inward longitudinal movement to the pawl bar 40. The pawl bar is formed with a rounded nose on the side edge opposite to the extension 43 for engagement by the outer edge of the bracket arm 21 to cause the pawl bar to move into engagement with the teeth on the sector 38. Such movement of the bracket arm 21 is made possible by an elongate slot 46 in the arm 21 which extends in the longitudinal direction of the pawl bar 40 and extending through the slot 46 is the shouldered rivet 24 which connects the frame members 18.

Thus, it will be manifest that upon a sudden jolt of the vehicle moving forwardly, such as by a sudden stop or abrupt deceleration, the seat S tends to surge forwardly and in so doing, imparts, through the regulator arms 10 and 11, an outward or forward movement to the piston 29 and cylinder 34. This movement is imparted to the bracket arm 21, which, in view of its rivet and slot connection with the frame members 18, also moves forward, rocking about the rivet 22 as a fulcrum, and causes the pawl bar similarly to move so that its teeth engage and mesh with the teeth in the sector 38. The movement by which the pawl bar is brought into meshing engagement with the sector 38 is very slight because normally the teeth on the pawl bar are in close juxtaposition to the teeth of the sector. In this manner, under the circumstances mentioned, the seat S is positively locked in position almost immediately and without any appreciable forward movement. As will hereinafter appear, the parts remain in such locked position only until the jar or shock has subsided or the force dissipated.

The slight forward movement of the seat in the event of sudden vehicle deceleration causes the piston 29a to move forwardly or outwardly in the cylinder 34 and thus creates a partial vacuum inasmuch as the solenoid operated valve 33 is closed or seated. This partial vacuum operates to retain the lever arm 21 in the raised position effectively to maintain the mechanism in locked engagement as previously described.

Normally, the teeth on the sector 38 and the pawl bar 40 are disengaged in response to the inwardly acting forces exerted by the coil spring 35 on the lever arm 10 and the arm 21 which, operating through the cylinder assembly as a rigid strut, forces the pivotal portion of the lever arm 21 and the pawl bar 40 to the outward or the disengaged position. The above movements are made possible in view of the predetermined distribution of force moments, it being evident that the inwardly acting forces exerted by the coil spring 35 are substantially equal. However, since the distance between the spring connection 36 and the cylinder anchor which operates as the pivot for the arm 21, is greater than the distance between the spring connection 37 on the arm 10 and the upper connection of the piston rod, a greater leverage or force results in connection with the former combination which operates to move the arm 21 in the direction above stated.

In addition, the teeth on the sector 38 and pawl bar 40 are inclined to afford substantially cam surfaces so that rocking movement of the arm 11 in a clockwise direction, such as when the seat is moved rearwardly, operates to cam the pawl bar teeth away from the sector teeth. Manifestly, operation of the mechanism to cause rearward movement of the seat S operates positively to disengage the teeth. Thus the locking action of the teeth is effective only to check the forward movement of the seat.

The mechanism above described is entirely automatic in operation and due to its simplicity and positiveness, is entirely reliable and efficient, forming a part of the seat adjusting mechanism which can be conveniently installed on the vehicle at one time.

It is to be understood that numerous changes in details of construction, arrangement and operation may be effected without departing from the spirit of the invention especially as defined in the appended claims.

What I claim is:

1. In an automotive vehicle having a seat mounted for back and forth shifting movements, power mechanism connected to the seat for effecting such shifting movements, said mechanism including a frame having a cross bar at one end, a mounting bracket for said cross bar, a pair of arms secured to said cross bar and extending in a general parallel direction, one of said arms being fixed to the cross bar and the other one mounted for pivotal movements, a pair of regulator arms pivoted at their outer ends to the opposite ends of said frame arms, a pivotal connection between the inner ends of said arms, a connection between said inner ends and the seat whereby conjoint swinging movement of said arms imparts shifting movement to the seat in one direction or the other, a piston and cylinder assembly connected at one end to one of said regulator arms, a bracket arm pivoted to one of said frame arms at one end, a mounting for the other end of said piston and cylinder assembly on said bracket arm adjacent the pivotal connection thereof, a coil spring secured at one end to the free end portion of said bracket arm and to the other of said regulator arms, a toothed sector forming a part of one of the regulator arms, a bar mounted for rectilinear movement on one frame arm, teeth on the end of said bar for engagement with the teeth of said sector, an extension on the end of said bracket arm in the region of the pivotal mounting thereof, and co-acting cam surfaces on said extension and the adjacent portion of said bar whereby rocking movement of said bracket arm in one direction causes movement of said bar in a direction toward the sector for causing the teeth on the bar to engage the sector teeth to lock the regulator arms from movement, movement of the bracket arm in the opposite direction causing movement of said bar in the opposite direction to free the teeth from engagement.

2. In an automotive vehicle having a floor and a frame rigidly secured thereto, a seat mounted on said floor for back and forth shifting movements, power mechanism connected to the seat for effecting such shifting movements, said mechanism comprising an arm pivoted at one end to said frame and pivotally connected to the seat at its opposite end, a piston and cylinder assembly means connecting one end of said assembly parts to said frame, the other of said assembly parts being operatively connected to said arm for imparting swinging movement thereto, a toothed sector forming part of said arm, a bar mounted on said frame for rectilinear movement toward and away from said toothed sector, teeth on said bar for meshing with the teeth of said sector, and said assembly connecting means having a lost motion connection with said frame and being in operative engagement with said bar whereby a sudden movement of the seat imparts movement to the piston and cylinder assembly thereby to move said bar to cause the teeth thereof to engage the teeth of the sector and lock the arm against swinging movement.

3. A mechanism as claimed in claim 2, in which the operative connection between the piston and cylinder assembly and the bar comprises a spring-tensioned bracket arm to which one end of the piston and cylinder assembly is connected, a support providing a pivotal mounting for one end portion of said bracket arm, an extension on such end of said bracket arm, and means connecting said extension and said bar whereby rocking movement of said bracket arm imparts rectilinear movement to said bar.

4. In an automotive vehicle having a floor and a frame rigidly secured thereto, a seat mounted on said floor for back and forth shifting movements, power mechanism connected to the seat for effecting such shifting movements, said mechanism comprising an arm pivoted at one end to said frame and pivotally connected to the seat at its opposite end, a motor assembly including linearly movable parts, means connecting one end of said assembly parts to said frame, the other of said assembly parts being operatively connected to said arm for imparting swinging movement thereto, a sector swinging with said arm, a bar mounted on said frame for movement toward and away from said sector, detent means on said bar for engaging said sector, and said assembly connecting means having a lost motion connection with said frame and being in operative engagement with said bar whereby a sudden movement of the seat imparts movement to the said motor assembly thereby to move said bar to cause the detent means thereof to engage the sector and lock the arm against swinging movement.

JOHN B. PARSONS.

REFERENCES CITED

The following references are of record in the file of this patent:

UNITED STATES PATENTS

| Number | Name | Date |
|---|---|---|
| 1,857,106 | Bishop | May 3, 1932 |
| 1,934,893 | Thomas | Nov. 14, 1933 |
| 1,962,789 | Simpson et al. | June 12, 1934 |
| 2,064,592 | De Cary | Dec. 15, 1936 |
| 2,227,717 | Jones | Jan. 7, 1941 |
| 2,242,247 | Grant | May 20, 1941 |
| 2,283,761 | Richter | May 19, 1942 |